United States Patent [19]
Liversidge

[11] Patent Number: 6,073,349
[45] Date of Patent: Jun. 13, 2000

[54] WIRE STRIPPER

[76] Inventor: Barry P. Liversidge, The Wick, Wick Road, Langham, Colchester, Essex, C04 5PE, United Kingdom

[21] Appl. No.: 09/043,199

[22] PCT Filed: Sep. 13, 1996

[86] PCT No.: PCT/GB96/02277

§ 371 Date: Mar. 13, 1998

§ 102(e) Date: Mar. 13, 1998

[87] PCT Pub. No.: WO97/10633

PCT Pub. Date: Mar. 20, 1997

[30] Foreign Application Priority Data

Sep. 13, 1995 [GB] United Kingdom .................. 9518674

[51] Int. Cl.[7] ..................................................... H02G 1/12
[52] U.S. Cl. ............................. 30/90.7; 30/90.1; 30/90.4; 30/90.6
[58] Field of Search ................................... 30/90.6, 90.4, 30/90.1, 90.2, 90.7

[56] References Cited

U.S. PATENT DOCUMENTS

| | | | |
|---|---|---|---|
| 1,866,095 | 7/1932 | Foley | 30/90.7 |
| 3,710,654 | 1/1973 | Halverson et al. | 30/90.6 |
| 3,881,249 | 5/1975 | Cox, Jr. | 30/90.7 |
| 3,946,487 | 3/1976 | Bieganski | 30/90.7 |
| 4,472,877 | 9/1984 | Undin et al. | 30/90.7 |
| 4,526,068 | 7/1985 | Undin et al. | 30/90.7 |
| 5,345,681 | 9/1994 | Undin | 30/90.4 |
| 5,487,220 | 1/1996 | Saitou | 30/90.6 |
| 5,613,300 | 3/1997 | Schmidt | 30/162 |
| 5,644,843 | 7/1997 | Young | 30/162 |
| 5,809,652 | 9/1998 | Ducret | 30/90.7 |

*Primary Examiner*—Kenneth E. Peterson
*Assistant Examiner*—Sean Pryor
*Attorney, Agent, or Firm*—Andrus, Sceales, Starke & Sawall

[57] ABSTRACT

A wire stripper has a blade (33) projecting from a carrier (35) mounted in a handle (56). A hook-shaped wire clam (45) is slidably mounted in the handle and is spring-urged towards a position where a wire is pressed by the clamp on to the blade. The clamp (45) may be turned relative to the blade (35) about the axis of the handle between first and second positions when the blade performs a circumferential cut around a held wire or a longitudinal cut along a held wire, respectively. The clamp (45) may be turned through an acute angle from the first position to a third position where the blade (33) performs a helical cut along a held wire. A spring biases the clamp to the first position, or selectively to the third position.

15 Claims, 8 Drawing Sheets

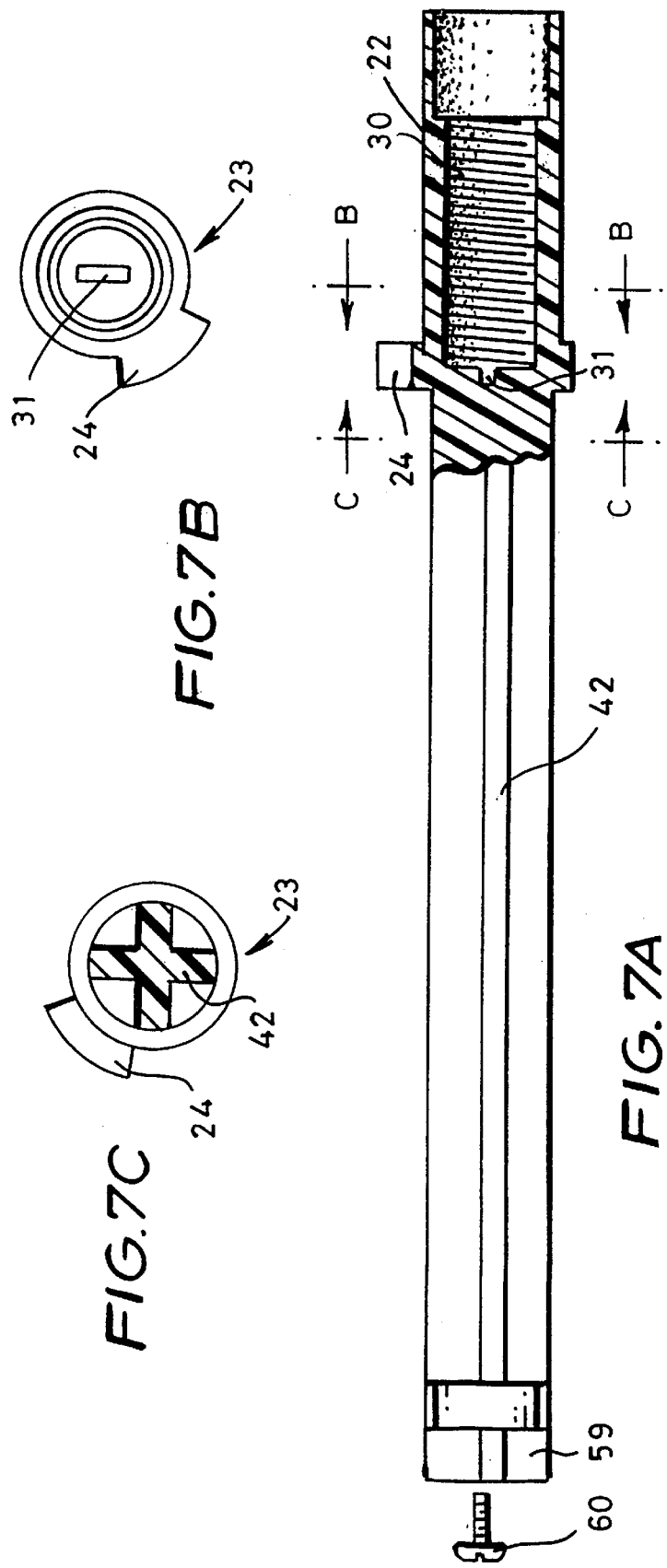

FIG.12A
FIG.12B
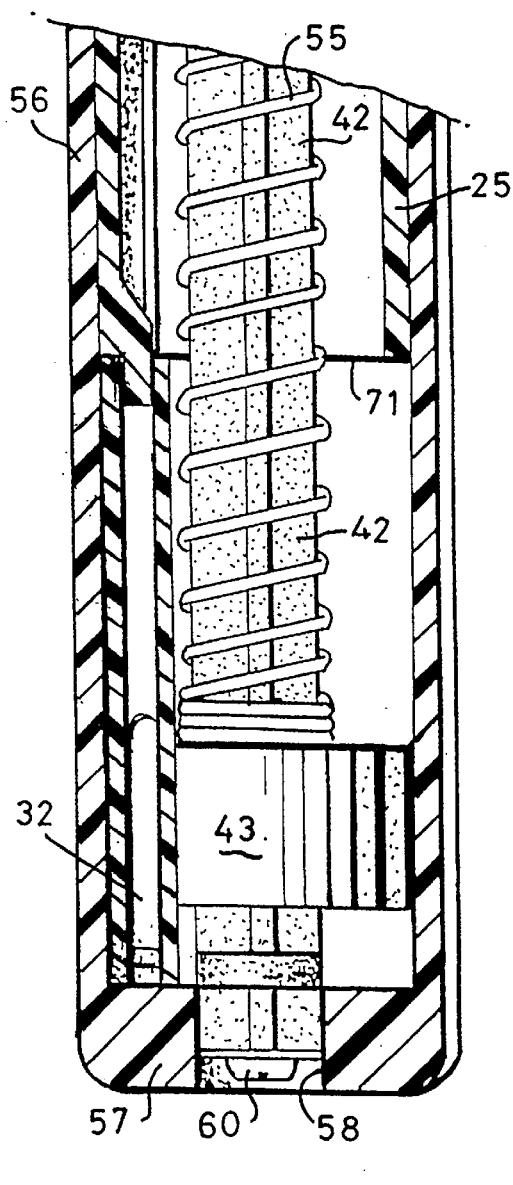
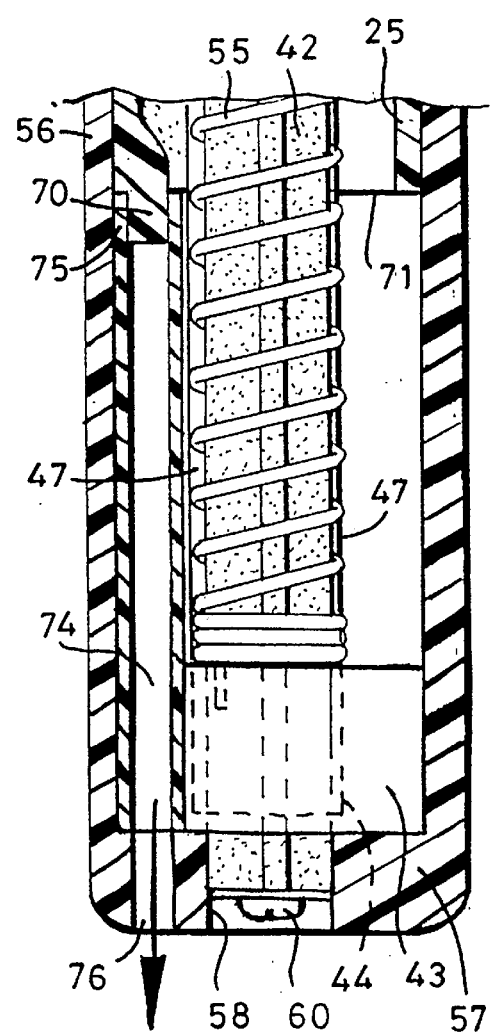
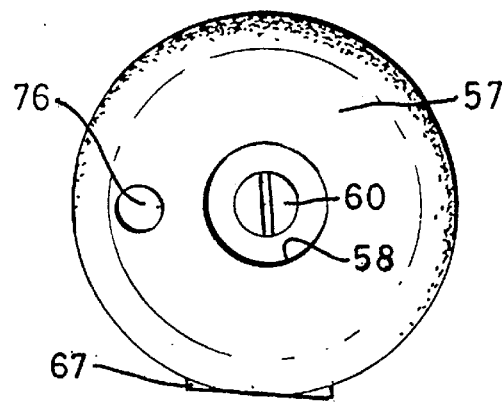
FIG.13

WIRE STRIPPER

This invention relates to a wire stripper—that is to say, a tool intended normally to remove insulation from an insulated electrical wire or cable. The term "wire stripper" as used herein is not to be regarded as limited to this normal use; the wire stripper of this invention may be used to assist in the removal of any outer sheath from an elongate filamentary member.

In this Specification, the term "wire" will be used broadly to refer to all kinds of filamentary member (such as an electrical conductor) having an outer sheath (in the case of an electrical conductor, a sheath of electrical insulation).

A known kind of wire stripper has a body from which projects a cutting blade, the body supporting a wire clamp in the form of a hook-like member adapted to receive the insulated wire to be stripped and urge that wire into engagement with the projecting cutting blade. Once an end portion of the wire has properly been located within the clamp and the blade has penetrated the insulation, the tool may be rotated around the wire to effect an annular cut in the insulation. The end portion of the insulation may then be removed from the wire so exposing the conductors.

A wire stripper as described above particularly lends itself to the stripping of relatively large diameter wires and to the stripping of heavy duty or tough insulation sheaths. In order to facilitate such stripping, it is also known to arrange for the blade to be rotatable to a second position at 90° to the normal blade position where an annular cut may be performed. This allows a linear cut to be made to the end of the wire from the annular cut following the completion of the latter.

In GB-A-1196140 there is described a tool of the above kind, where the blade is cranked and is rotatably mounted in a holder so that the blade may perform a storing action. The blade will thus take up an appropriate position dependent upon whether the user rotates the tool around the wire, or pulls the tool towards the end of the wire.

In GB-2108773-A there is described another such a tool but here a lever is provided to allow the user to move the blade between its two positions respectively for annular and linear cuts, the blade being spring-urged to the annular cut position. With some difficulty, the user may also hold the lever at an intermediate position so that on rotating the tool about a wire, the tool makes a helical cut along the insulation.

The above-described tools, though widely employed for stripping insulation from large diameter wires or wires having heavy duty or tough insulation, require considerable user dexterity, especially when a helical cut is to be made. For example, it is difficult to hold the lever of the tool of GB-2108773-A at an appropriate and constant position whilst simultaneously rotating the tool about the wire, in order to perform a helical cut.

The present invention aims at addressing the disadvantages of the known forms of wire stripper of the kind described above, in order to provide a tool which is relatively easy to use and yet which is effective at producing annular, linear and helical cuts to facilitate the removal of insulation from the wire.

According to one aspect of the present invention, there is provided a wire stripper comprising a blade carrier supporting a projecting cutting blade, a selector rotatably mounted on the blade carrier, a wire clamp slidably mounted on the selector and arranged to hold a wire to be stripped and to urge that wire against the cutting blade, co-operating abutment means on the blade carrier and the selector positively to define first, second and third cutting positions, in the first cutting position the blade being set to rotate around a held wire, in the second cutting position the carrier and blade being turned through substantially 90° from the first cutting position whereby the blade is set to perform an axial cut, and in the third cutting position the carrier and blade being turned through an acute angle from the first cutting position whereby the blade is set to perform a helical cut, and spring means applying a rotational bias to the blade carrier whereby the carrier is torsionally urged selectively to either of the first or third cutting positions.

It will be appreciated that in the tool of the present invention, there is provided a positive stop arrangement for the cutting blade whereby the blade may be set to perform annular, axial or helical cuts, and in the case of the helical cut, there is no need for the operator to exercise skill in ensuring the blade remains turned to the appropriate position. Moreover, whenever the tool is released, it will always reset itself for performing either an annular cut or a helical cut, dependent upon the setting of the selector, ready to perform a further similar cut.

According to a second aspect of the present invention, there is provided a wire stripper comprising a blade carrier supporting a projecting cutting blade, a selector rotatably mounted on the blade carrier, a wire clamp slidably mounted on the selector and having a first portion arranged to hold a wire to be stripped and to urge that wire against the cutting blade and a second portion projecting inwardly of the tool from the first portion, co-operating abutment means on the blade carrier and the selector positively to define a first cutting position where the blade is set to rotate around a held wire, the blade carrier being rotatable to a second cutting position where the carrier and blade are turned through substantially 90°0 from the first cutting position whereby the blade is set to perform an axial cut, and a compression spring arranged between and connected at its two ends respectively to the blade carrier and the second portion of the clamp member, the compression spring being pre-stressed to urge apart the blade carrier and the second portion of the clamp member thereby to bias the wire clamp to its wire-holding position and also to apply torque to the blade carrier to urge the carrier away from its said second cutting position selectively towards the first or second cutting positions.

The use of a single spring to perform the combined functions of biasing the blade carrier to allow automatic resetting of the tool, ready to perform a further cut, and also of biasing the clamp member to its wire-clamping position allows the construction of a compact and easy to use tool. This may be contrasted with the previous arrangements, all of which have employed at least two springs, one for each of these two functions separately.

In the preferred embodiment of tool of this invention, the abutment means is arranged such that the carrier is turned in one sense from the first cutting position in order to reach the second cutting position, but is turned in the opposite sense from the first cutting position in order to reach the third cutting position. The selector itself advantageously is slidable axially with respect to the blade carrier whereby the carrier may be moved from its first cutting position to its third cutting position by axial movement of the selector towards a held wire.

The tool may include means carrying a spare blade, for example arranged within a sleeve which at least partially surrounds the blade carrier itself, whereby the spare blade is arranged parallel to the blade carrier axis and adjacent the end of the sleeve remote from the cutting blade. Access to such a spare blade may be restricted until the selector has appropriately been moved in order to free the blade carrier to move to a fourth position arcuately outside the normal range of movement of the blade carrier.

By way of example only, one specific embodiment of wire stripper constructed and arranged in accordance with the present invention and also a modified form of that stripper will now be described in detail, reference being made to the accompanying drawings, in which:

FIGS. 7A, 7B and 7C show respectively a partial sectional view on the blade carrier and cross-sections through that carrier on lines B—B and C—C marked on FIG. 7A;

FIGS. 12A and 12B are partial sectional views on a modified form of the tool and showing a spare blade holder with the tool set respectively to closed and access positions;

FIG. 13 is an end view on the modified form of the tool; and

Figure 1:
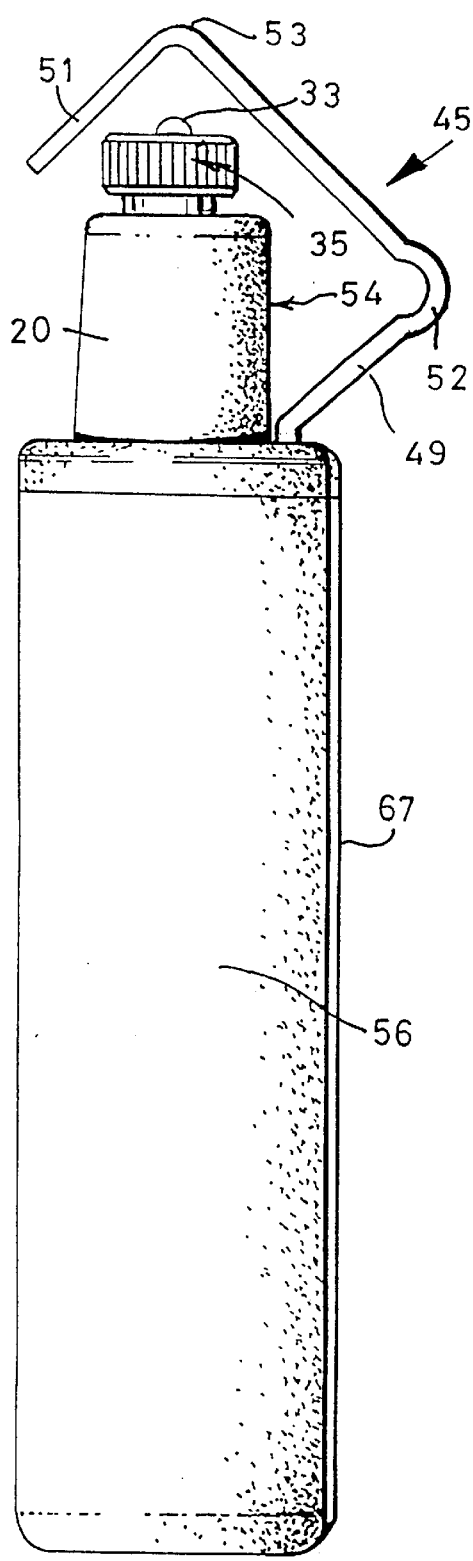
FIG. 1 is a side view of the tool when set to perform an annular cut.

The wire stripping tool shown in the drawings comprises a blade carrier 23 having a cylindrical end portion 22 which is rotatably located in a bore 21 in a selector 20. A collar is formed around the blade carrier at the inner end of the end portion, the collar having a radially projecting lug 24 which is accommodated within a tubular portion 25 of the selector 20. Three abutment surfaces 26, 27 and 28 are provided within tubular portion 25, with which the lug 24 is engageable upon rotation of the blade carrier 23 with respect to the selector.

Figure 9A:
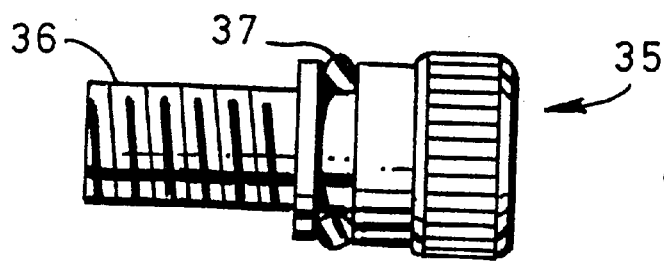
FIGS. 9A and 9B are respectively side and sectional views of the cutting depth adjusting screw.
Figure 9B:
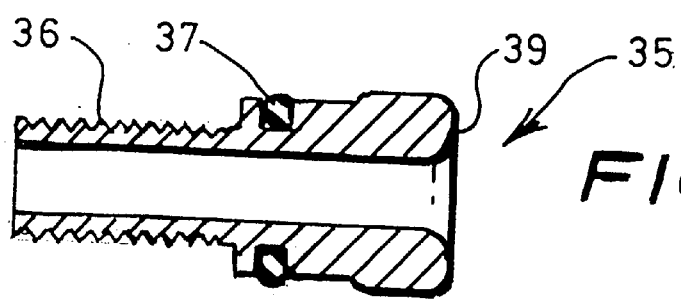

The end portion 22 of the blade carrier 23 is internally threaded at 30 and the blind end of the threaded portion has a diametral slot 31. Received in the end portion 22 is a cutter 32 having at one end a cutting blade 33 and at the other end a transverse peg 34 which locates in slot 31. The cutter 32 is held in position within the blade carrier by means of a depth-of-cut adjusting screw 35 (FIG. 9), the threads 36 of which are engageable with threads 30 of the blade carrier. A resilient O-ring 37 provides friction between the adjusting screw 35 and the blade carrier to resist unintentional turning of the screw. The cutter 32 extends through the adjusting screw 35 and a compression spring 38 serves to maintain peg 34 in engagement with slot 31 in the carrier. Rotation of the adjusting screw adjusts the amount by which cutting blade 33 projects beyond end face 39 of the screw, and removal of the screw allows a worn cutter 32 to be replaced by another. The end face 39 of the screw 35 may be coated with a low friction material, such as polytretrafluoroethylene. Alternatively, the screw 35 could be moulded from a low friction plastics material.

The blade carrier has a shaft 42 of cruciform section projecting within the tool from lug 24. Slidably mounted on that shaft is a block 43 having a cylindrical bore so that the blade carrier may rotate with respect to the block. A slot is formed in the block parallel to the axis of the bore and the end tang 44 of a clamp 45 is fixed within that slot. The clamp 45 is formed from a metal strip and has an elongate portion 47 (on the free end of which is formed the tang 44) which passes through a slot 48 formed in the selector 20. The part of the clamp 45 located externally of the selector 20 is generally hook-shaped and is defined by sections 49, 50 and 51, with a rounded region 52 between sections 49 and 50. The corner 53 between sections 50 and 51 lies on the axis of the tool, above the projecting blade 33. The inwardly-directed surfaces of the clamp 45 external of the selector 20 may be coated with a low-friction material, such as polytetrafluoroethylene.

A helical compression spring 55 acts between lug 24 and collar of the blade carrier 23 and block 43 mounted on that carrier. As shown, the two ends of the spring are turned through 90° and are located in holes formed respectively in the lug of the carrier 23 and the block 43. As fitted, the spring urges the block axially away from the cutting blade 33 and also applies torque to the blade carrier 23 to urge the lug 24 towards the abutments 26 and 27 of the selector 20. The block itself is restrained against rotation by means of the elongate portion 47 of the clamp, extending through slot 48 in the selector 20.

Rotatably fitted around the tubular portion 25 of the selector 20 is a sleeve 56, the lower end (in FIGS. 1 to 5) of which is provided with an inwardly directed flange 57 having a cross-shaped central opening 58 in which is received the correspondingly-shaped end portion 59 of the blade carrier shaft 42. A screw 60 serves to lock the sleeve 56 to the blade carrier 23.

Figure 4:
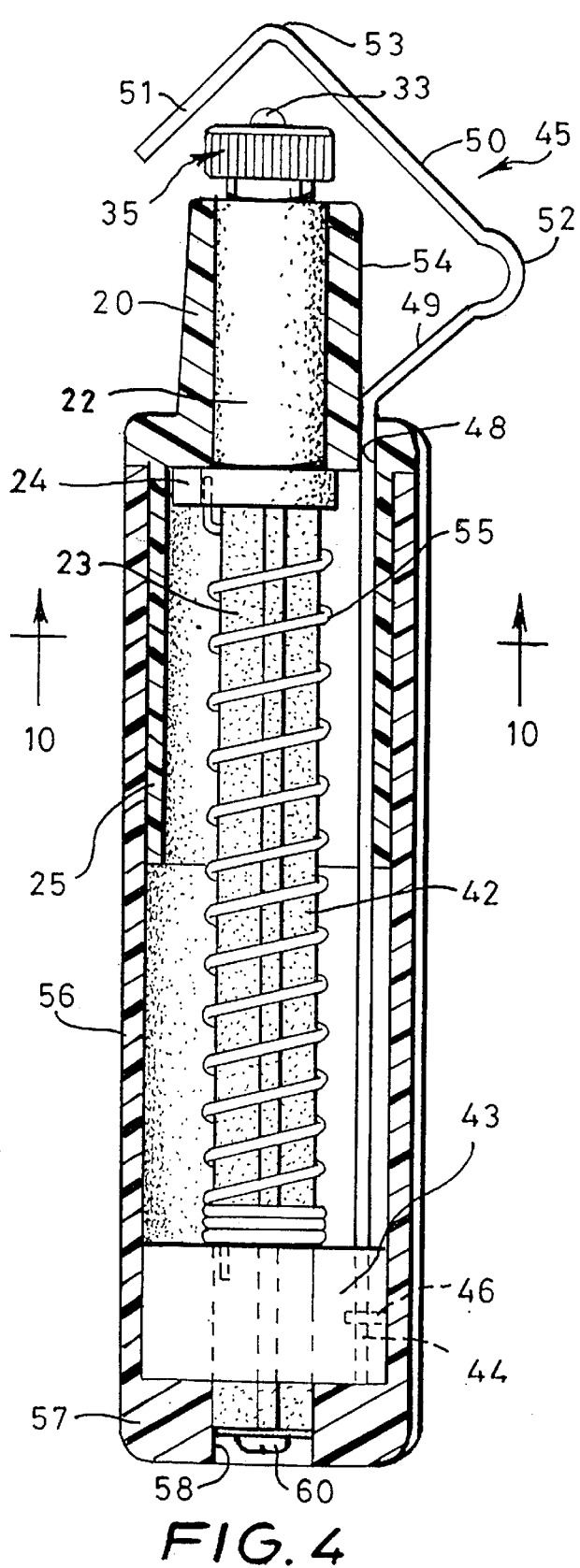
FIG. 4 is an axial section through the tool when set as shown in FIG. 1.
Figure 10A:
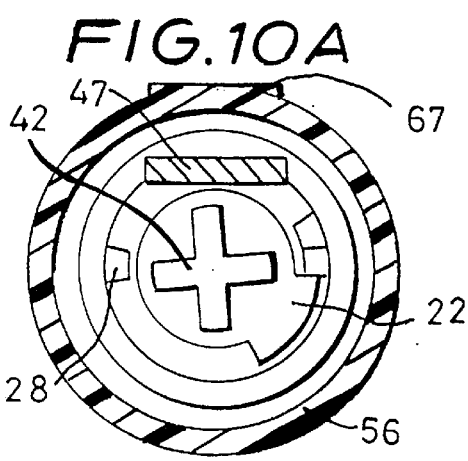
FIGS. 10A, 10B, 10C and 10D are cross-sections through the tool on line 10—10 marked on FIG. 4 and respectively showing the tool set to annular, axial, helical and blade-changing positions.
Figure 10C:
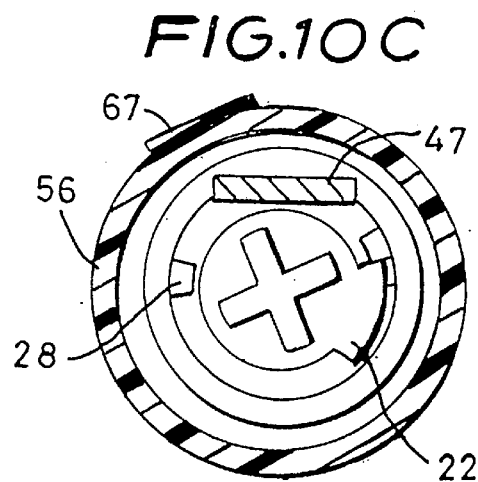
Figure 10B:
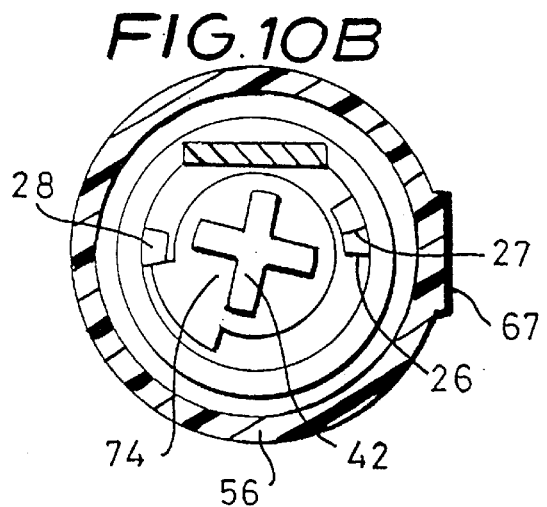

The "normal" position of the tool is illustrated in FIGS. 1, 4 and 10A. Here, one side face of the lug 24 is engaged with abutment surface 26 within the selector 20, this engagement being maintained by the torque applied by spring 55. The cutting blade 33 is set to perform an annular cut and the corner 53 of the clamp member is at its closest position to that blade.

Figure 5:
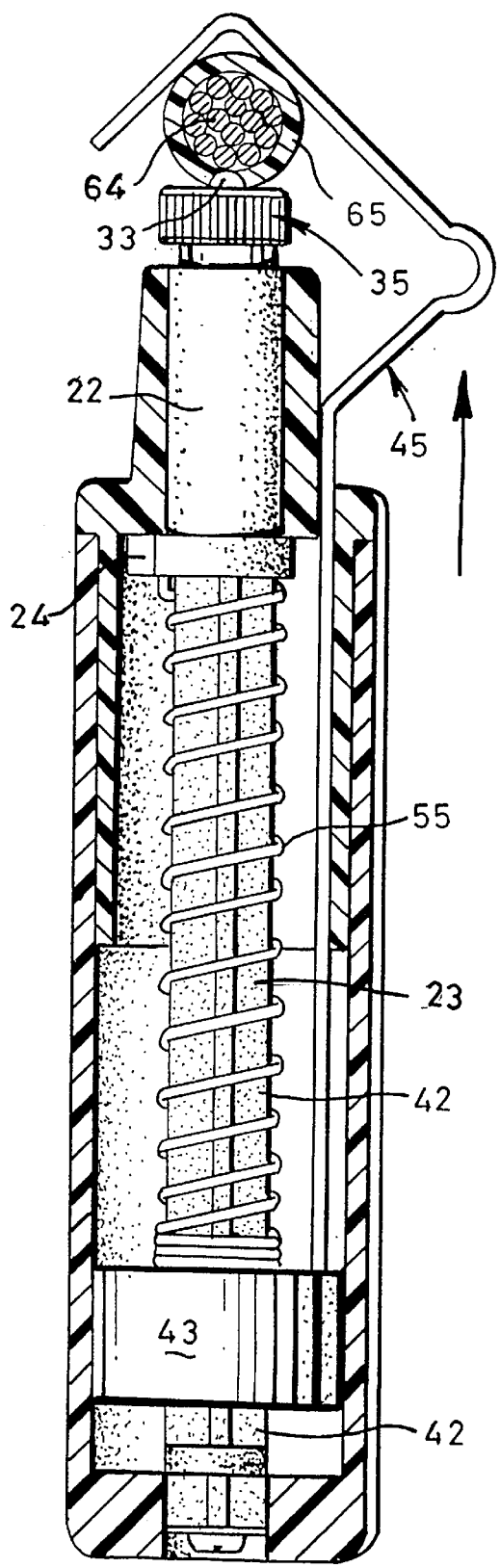
FIG. 5 is an axial-section through the tool and a held wire, ready to perform an axial cut.

When insulation is to be stripped from a wire 64, the projection of the blade 33 beyond the end face 39 of the adjusting screw 35 is set to suit the radial thickness of the insulation 65. Then, the clamp member 45 is pushed to be spaced further from the sleeve 56, against the action of spring 55, the wire is located between sections 50 and 51 of the clamp, and the clamp is released so that the spring force causes the blade 33 to penetrate the insulation, as shown in FIG. 5. The tool is then rotated around the wire so that the blade 33 performs an annular (i.e. radial) cut into the insulation.

The rounded region 52 between sections 49 and 50 of the clamp 45 facilitates pushing of the clamp further away from the sleeve 56. A user may grasp the sleeve in the palm of his hand with his four fingers and then may use his thumb to drive the clamp 45 away from the sleeve, the rounded region 52 providing a convenient thumb-grip. It will be seen that though the external surface of the selector 20 in the region of its axial bore is generally conical, there is a flat 54 provided on one side and along which the elongate portion 47 of the clamp 45 slides. This imparts stability to the clamp.

Figure 2:
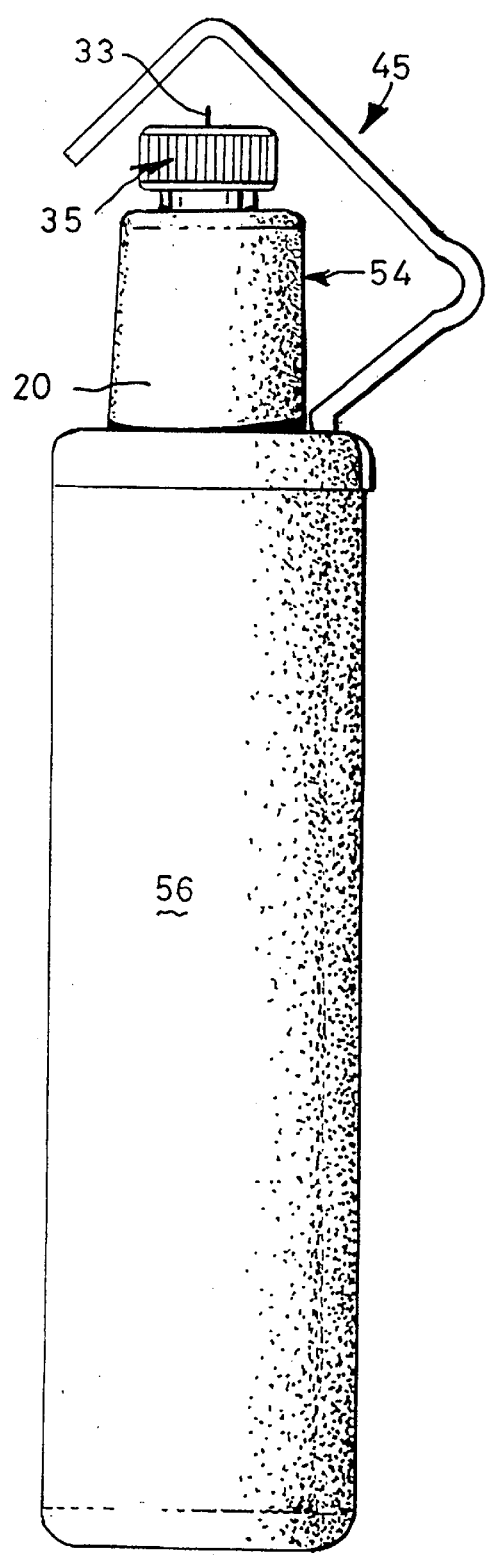
FIG. 2 is a side view of the tool when set to perform a linear cut.

For some wires, no further cut need be made in order to allow the insulation to be removed from the conductor. More usually, the sleeve 56 will be turned through 90°, so turning the blade carrier 23 through 90° against the action of spring 55, until the opposite side face of lug 24 engages abutment surface 28 within the selector 20. This position is shown in FIG. 2 and the tool is now set to perform a linear cut axially of the wire, by pulling the tool along the wire. This action is particularly convenient (by a right-handed person but only a little less so by a left-handed person) to perform, grasping the sleeve 56 of the tool; the sleeve may be rotated and then pulled in one smooth movement. Upon the tool coming free of the wire, the selector 20 and clamp 45 move under the action of the spring 55, to return the tool to its original position, ready to perform a further stripping operation.

Figure 3:
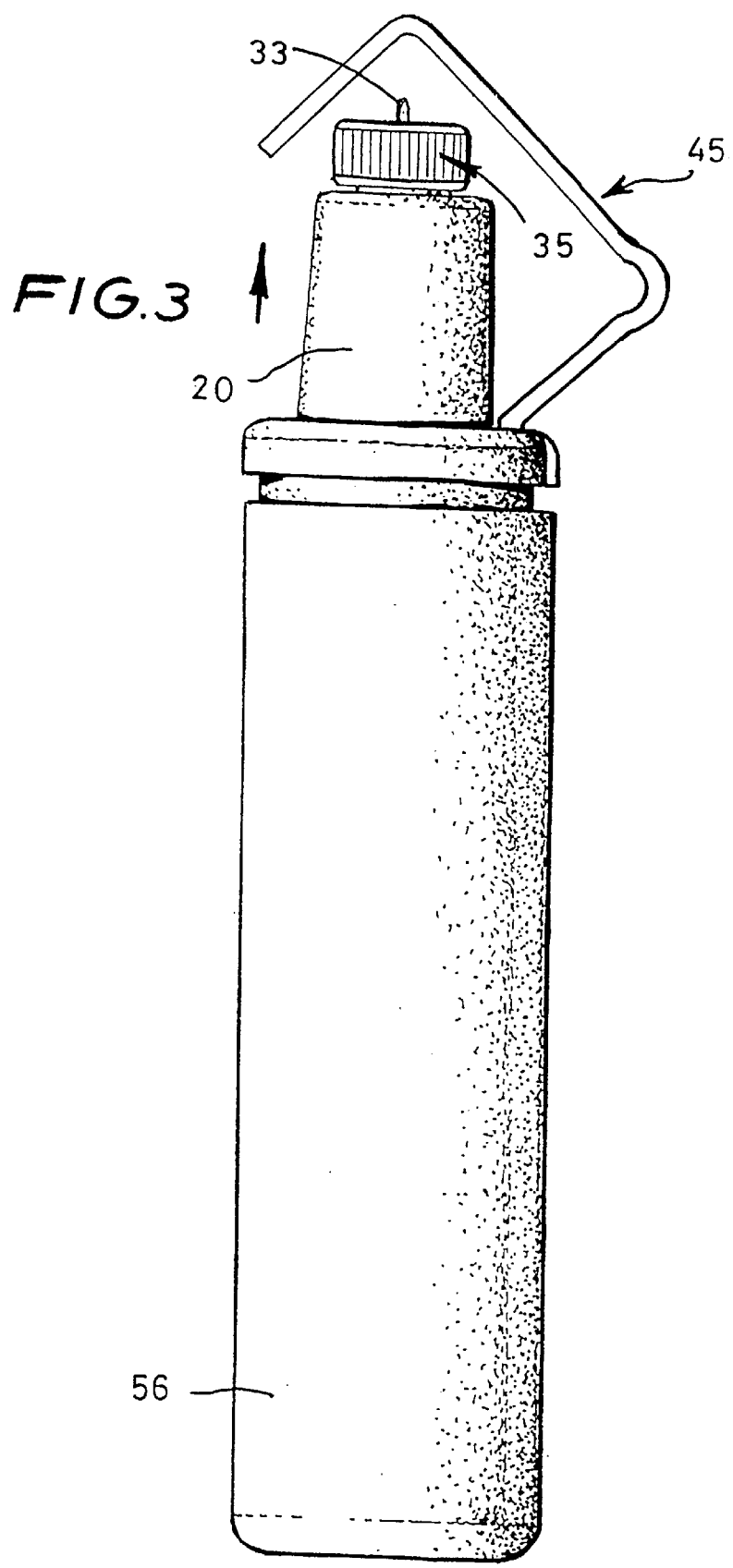
FIG. 3 is a side view of the tool when set to perform a helical cut.
Figure 6:
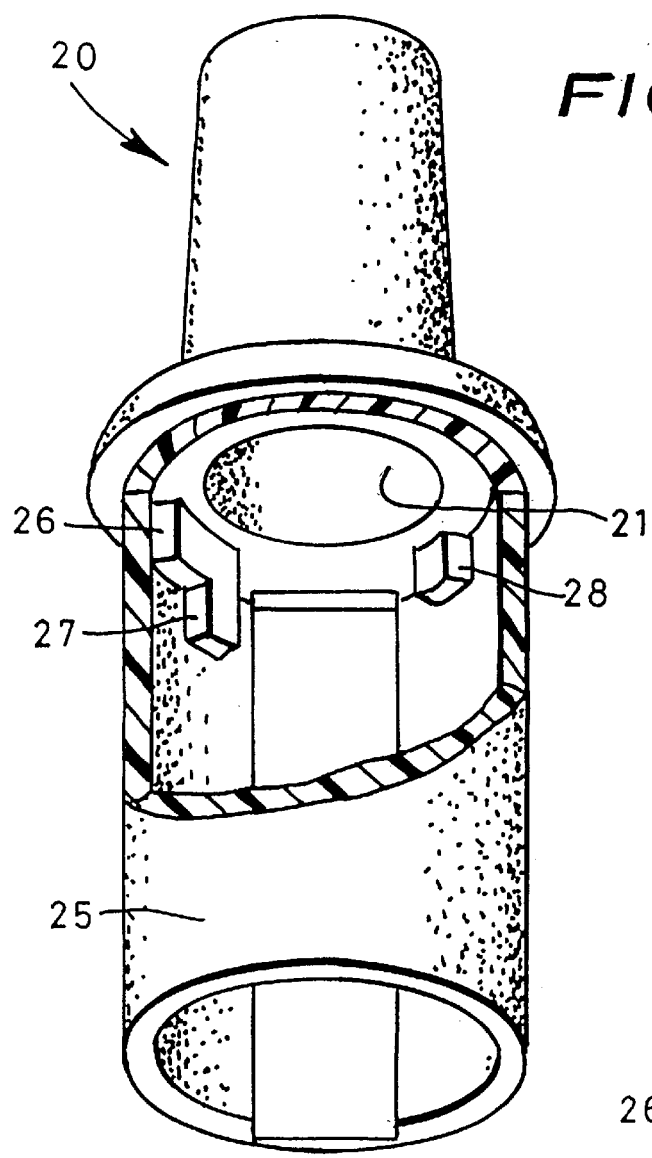
FIG. 6 is a partially cut-away view of the selector.
Figure 11:
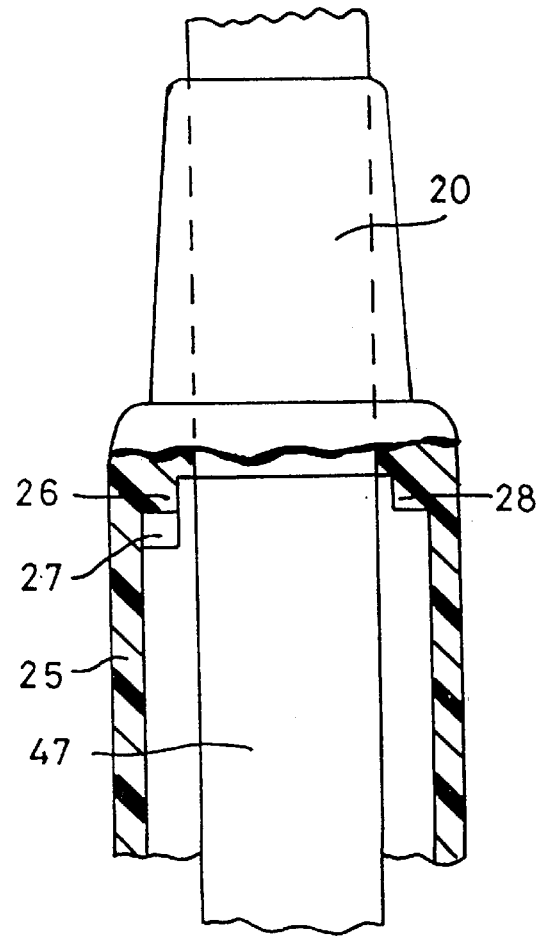
FIG. 11 shows part of the selector and sleeve together with a part of the clamp.
Figure 8A:
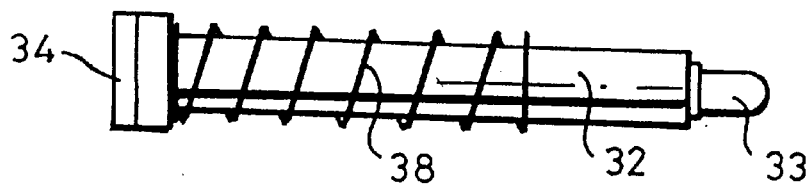
FIGS. 8A and 8B are two side views of the cutter.
Figure 8B:
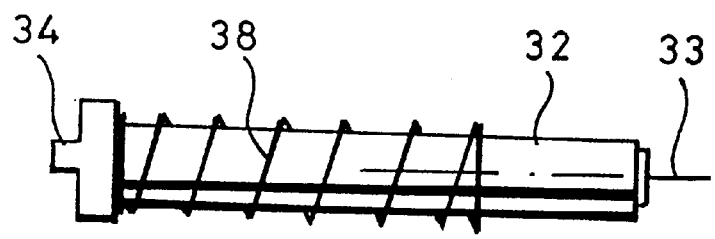

If it is desired to effect a helical cut along the insulation, for example in the case of a particularly tough insulation layer, following the completion of the annular cut the selector 20 is pushed axially away from the sleeve 56, as illustrated in FIG. 3. This allows the lug 24 to ride over abutment surface 26 and engage abutment surface 27 (FIG. 6) under the action of the spring 55. Typically, the abutment surfaces 26 and 27 are spaced by 15° of arc, to give a helical cut on rotating the tool about the wire to be stripped.

When the blade 33 of the cutter 32 becomes worn, the cutter may be exchanged for another by pushing the clamp 45 as far as possible away from sleeve 56 (and so until the upper surface of the block 43 engages the inner skirt of the selector 20) and then unscrewing the adjusting screw 35 to release the cutter. So long as the adjusting screw is in position within the blade carrier 23, the selector 20 cannot be pushed much further away from sleeve 56 than is required for the helical cut setting because the selector will foul on the adjusting screw 35. This prevents lug 24 riding over abutment surface 27.

Figure 14:
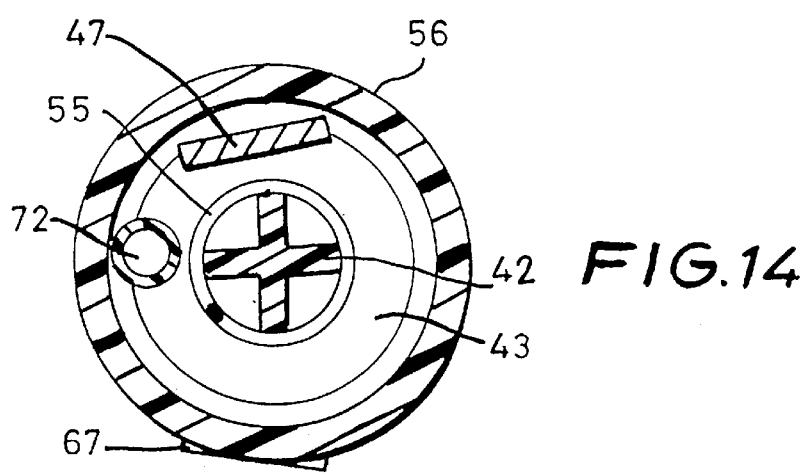
FIG. 14 is a cross-section through the modified form of tool, taken on line 14—14 marked on FIG. 12B.

FIGS. 12 to 14 show a modified form of the tool illustrated in FIGS. 1 to 11, wherein provision is made for the carrying of a spare cutter. In all other respects the tool is the same as that described above and like parts are indicated with like reference characters: those parts will not be described again here.

Figure 10D:
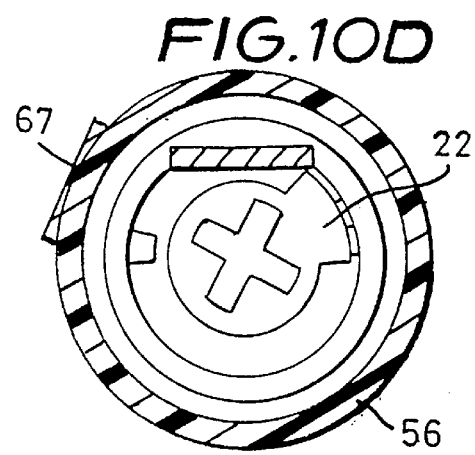

The tubular portion 25 of the selector 20 has a pin 70 projecting parallel to the selector axis, beyond the skirt 71 of that portion 25. A generally C-shaped groove 72 is formed in the block 43 and a tube 74 is positioned within that groove 72 with the tube end 75 located on the pin 70. The flange 57 of the sleeve 56 has an opening 76 which may come into alignment with the tube 74 upon rotation of the sleeve with respect to the selector 20 and so also the block 43. The configuration is such that the alignment can be achieved only when the lug 24 of the blade carrier 23 is moved further beyond the abutment surface 27 of the selector 20—and this can be achieved only once the adjusting screw 35 has been removed so allowing the selector 20 to be pushed axially further away from the sleeve 56 than is required for the helical cut setting illustrated in FIG. 3. This movement further beyond abutment surface 27 will be under the action of the spring 55 but is limited by the lug 24 engaging the elongate portion 47 of the clamp 45, as shown in FIG. 10D.

In addition to removing insulation from the end portion of a wire, the tool may conveniently be used to remove a section of insulation part way along the length of a wire. This is achieved by making a first annular cut, then a helical cut from that annular cut for the required distance and finally a further annular cut at the other end of the helical cut. Thereafter, the insulation may easily be removed, for example by using a pair of side cutters.

The sleeve 56 has a flat 67 formed along its length. This serves as a convenient reference point for operation of the tool, since in the "normal" (annular cut) setting, the flat 67 is aligned with the clamp 45. Moreover, the flat serves as a convenient surface on which to carry information such as the manufacturer's details.

What is claimed is:

1. A wire stripper comprising a selector, a blade carrier supporting a projecting cutting blade, the blade carrier being rotatable mounted on the selector, a wire clamp slidably mounted on the selector and for holding a wire to be stripped and to urge that wire against the cutting blade, co-operating abutment means on the blade carrier and the selector positively defining first, second and third cutting positions, in the first cutting position the blade being set to annularly cut a held wire, in the second cutting position the blade and carrier being disposed at substantially 90° with respect to the first cutting position of the blade whereby the blade is set to axially cut a held wire, and in the third cutting position the blade and carrier being disposed at an acute angle with respect to the first cutting position of the blade whereby the blade is set to helically cut a held wire, and spring means for applying a rotational bias to the blade carrier with respect to the selector whereby the carrier is torsionally urged selectively to either of the first or third cutting positions.

2. A wire stripper as claimed in claim 1, wherein the carrier is rotatable in one direction from the first cutting position in order to reach the second cutting position, and is rotatable in the opposite direction from the first cutting position in order to reach the third cutting position.

3. A wire stripper as claimed in claim 1, wherein the co-operating abutment means includes an abutment on the blade carrier, and first, second and third stops provided on the selector corresponding with the first, second, and third cutting positions, respectively.

4. A wire stripper as claimed in claim 3, wherein the carrier rotates in one direction from the first cutting position in order to reach the second cutting position, and rotates in the opposite direction from the first cutting position in order to reach the third cutting position, and further wherein the blade carrier is mounted on the selector for limited axial movement with respect thereto, the carrier being movable from its first cutting position to its third cutting position by axial movement of the selector towards a held wire to permit the carrier abutment to move over the first stop and rotate in said opposite direction to reach the third stop.

5. A wire stripper as claimed in claim 4, wherein the blade carrier is axially spring urged to a position where the carrier abutment engages the first stop.

6. A wire stripper as claimed in claim 5, wherein a helical spring acts between the selector and the blade carrier and serves to urge the carrier rotationally away from the second cutting position.

7. A wire stripper as claimed in claim 6 wherein the wire clamp is mounted with respect to the selector for sliding movement substantially parallel to the blade carrier axis, and is spring-urged toward a wire-clamping position.

8. A wire stripper as claimed in claim 7, wherein a single helical spring serves both to urge the carrier rotationally away from the second cutting position towards the first cutting position, and also to urge the wire clamp towards a wire-clamping position.

9. A wire stripper as claimed in claim 1 wherein an external sleeve surrounds at least a part of the selector and a part of the blade carrier, and is connected to the blade carrier to impart movement thereto with respect to the selector.

10. A wire stripper as claimed in claim 1 wherein the cutting blade is replaceably supported in the blade carrier.

11. A wire stripper as claimed in claim 9, wherein the cutting blade is replaceably supported in the blade carrier and there is provided means within the sleeve for carrying a spare blade, said means extending parallel to the blade carrier axis and adjacent the end of the sleeve remote from the cutting blade.

12. A wire stripper as claimed in claim 11, wherein the spare blade carrying means is in the form of a tube within which at least one spare blade is carried, which tube is held stationary with respect to the selector, and access to the spare blade may be gained by turning the sleeve to a position where an opening in the sleeve is aligned with the end of the tube.

13. A wire stripper as claimed in claim 12, wherein the opening in the sleeve is aligned with the tube by turning the sleeve to a position beyond any of the first, second and third cutting positions.

14. A wire stripper as claimed in claim 13, wherein the sleeve is moved to said aligned position by initially moving the selector axially away from the blade carrier to such an extent that the blade carrier is freed from said abutment means.

15. A wire stripper comprising a selector, a blade carrier supporting a projecting cutting blade, the blade carrier being rotatable mounted on the selector, a wire clamp slidably mounted on the selector and having a first portion for holding a wire to be stripped and to urge that wire against the cutting blade and a second portion projecting inwardly of the selector from the first portion, co-operating abutment means on the blade carrier and the selector positively defining a first cutting position where the blade is set to annularly cut a held wire, the blade carrier being movable with respect to the selector to a second cutting position where the carrier and blade rotate through substantially 90° from the first cutting position whereby the blade is set to axially cut a held wire, and a compression spring having a first end connected to the blade carrier and a second end connected to the second portion of the wire clamp, the compression spring being pre-stressed to urge apart the blade carrier and the second portion of the wire clamp thereby to bias the wire clamp to its wire-holding position and also to apply torque to the blade carrier to urge the carrier away from its said second cutting position towards the first cutting position.

* * * * *